Patented Oct. 12, 1948

2,450,879

UNITED STATES PATENT OFFICE 2,450,879

2,4-DI-TERTIARY-BUTYL-5-METHOXY BENZALDEHYDE

Marion Scott Carpenter, Nutley, and William M. Easter, Jr., Lodi, N. J., assignors to Burton T. Bush, Inc., New York, N. Y., a corporation of New Jersey No Drawing. Application May 24, 1947,
Serial No. 750,358

3 Claims. (Cl. 260—599)

This invention relates to a novel aromatic aldehyde and to a process for preparing it. More especially, the present invention relates to a 2,4-di-tertiary-butyl-5-methoxy-benzaldehyde.

The structural formula of our novel material may be represented as follows:

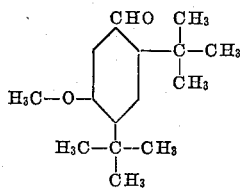

This new aldehyde is a colorless, crystalline material, having a mild but very persistent musk-like odor. It may be employed per se in perfumes and cosmetics and is of further value as an intermediate for the preparation of other new aromatic compounds.

Our novel compound is prepared by heating a material having the structural formula:

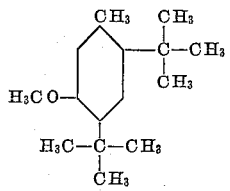

with an oxidation agent such as manganese dioxide in sulfuric acid, at an elevated temperature.

The $CH_3$ group is converted to the CHO group by our process. This is surprising in view of the fact that when p-cymene is similarly treated, the isopropyl group is attached before the methyl group, p-methyl acetophenone being formed. It was therefore unexpected to find that the tertiary-butyl group para to the $CH_3$ group would prove more resistant to oxidation than the isopropyl group in p-cymene.

Moreover, another unexpected finding herein is that the novel methyl ether, even though it does not contain 2 or 3 nitro groups, possesses a musk-like odor. The specificity of this phenomenon is all the more apparent when it is noted that the corresponding ethyl ether has little or no such musk-like odor.

In general, the process of this invention is conducted by agitating a mixture of the di-butylated cresol ether, aqueous sulfuric acid (20–60% $H_2SO_4$ content) and manganese dioxide at a temperature of about 50° to 90° C., for a period of time substantially to dissolve the manganese dioxide. This period may vary from 6 to 30 hours, or more.

At the end of the reaction period the organic component is removed and worked up by customary procedures, such as distillation, to isolate the aldehyde.

The following examples are given in order more fully to illustrate this invention, without however limiting the same to them.

EXAMPLE I

*Preparation of 2,4-di-tertiary-butyl-5-methoxy toluene*

To a refluxing solution of 220 grams commercial 2,4-di-tertiary-butyl-5-hydroxy toluene in 800 grams toluene, there is added gradually 130 grams of 40% caustic soda solution. Refluxing is continued under a water separator until all water has been removed from the batch, leaving a suspension of the sodium salt of 2,4-di-tertiary-butyl-5-hydroxy toluene in toluene. To this refluxing suspension there is then added, during ½ hour, 80 grams of dimethyl sulfate. Refluxing is continued 2 hours further, the mixture is cooled to room temperature, washed to neutrality with water, the toluene distilled off and the remainder distilled in vacuo. There is collected about 185 grams of 2,4-di-tertiary-butyl-5-methoxy toluene boiling at 108° C. under 3½ mm. of mercury pressure. The initially viscous, colorless oil rapidly congeals to a crystalline mass. After recrystallization from alcohol there is obtained about 176 grams of pure 2,4-di-tertiary-butyl-5-methoxy toluene as colorless, odorless crystals melting at 60°–62° C.

EXAMPLE II

*Preparation of 2,4-di-tertiary-butyl-5-methoxy benzaldehyde*

A mixture of 940 grams 2,4-di-tertiary-butyl-5-methoxy toluene, 400 grams manganese dioxide and 2,940 grams 40% sulfuric acid is agitated vigorously for 24 hours at a temperature of 65°–70° C. After cooling to room temperature the mixture is thinned by the addition of 1,000 grams of benzene or toluene, filtered, washed and distilled as in Example I, first at atmospheric pressure to remove the solvent and finally in vacuo. There is collected at 108° C. under a pressure of 3½ mm. of mercury about 647 grams of unreacted 2,4-di-tertiary-butyl-5-methoxy toluene, then an intermediate fraction of about 5 grams followed at 134° C. under the same pressure by about 212 grams of 2,4-di-tertiary-butyl-5-methoxy-benzaldehyde, which solidifies to a solid mass.

After recrystallization from half its weight of 80% ethyl alcohol, there is obtained about 200 grams of purified aldehyde. It is a colorless crystalline material melting at 68°–69° C. and having a mild but very persistent musk-like odor.

The foregoing illustrates the practice of this invention which however is not to be limited thereby but is to be construed as broadly as permissible in view of the prior art and limited solely by the appended claims.

We claim:

1. The compound having the formula, 2,4-di-tertiary-butyl-5-methoxy benzaldehyde and having a musk-like odor.

2. The process for preparing 2,4-di-tertiary-butyl-5-methoxy benzaldehyde, which comprises treating 2,4-di-tertiary-butyl-5-methoxy toluene with manganese dioxide in the presence of sulfuric acid at an elevated temperature.

3. The process of claim 2, wherein the temperature employed is within the range of about 65° C. to about 70° C.

MARION SCOTT CARPENTER.
WILLIAM M. EASTER, Jr.

REFERENCES CITED

The following references are of record in the file of this patent:

FOREIGN PATENTS

| Number | Country | Date |
|--------|---------|------|
| 22,121 | Great Britain | Oct. 27, 1898 |